United States Patent [19]
New et al.

[11] Patent Number: 6,072,348
[45] Date of Patent: Jun. 6, 2000

[54] PROGRAMMABLE POWER REDUCTION IN A CLOCK-DISTRIBUTION CIRCUIT

[75] Inventors: Bernard J. New, Los Gatos; Trevor J. Bauer, Campbell; Steven P. Young, San Jose, all of Calif.

[73] Assignee: Xilinx, Inc., San Jose, Calif.

[21] Appl. No.: 08/890,952

[22] Filed: Jul. 9, 1997

[51] Int. Cl.[7] .................................................... H03K 1/04
[52] U.S. Cl. ............................ 327/295; 327/99; 327/407
[58] Field of Search .............................. 327/99, 291, 292, 327/295, 298, 403, 404, 407, 544

[56] References Cited

U.S. PATENT DOCUMENTS

| | | | |
|---|---|---|---|
| 3,976,949 | 8/1976 | Hepworth et al. | 327/217 |
| 4,621,341 | 11/1986 | New | 364/933 |
| 4,686,386 | 8/1987 | Tadao | 327/143 |
| 4,894,557 | 1/1990 | Beltramini | 327/217 |
| 5,023,484 | 6/1991 | Pathak et al. | 307/465 |
| 5,065,052 | 11/1991 | Sakagami et al. | 327/19 |
| 5,075,640 | 12/1991 | Miyazawa | 331/10 |
| 5,086,387 | 2/1992 | Arroyo et al. | 327/145 |
| 5,121,416 | 6/1992 | Takano | 375/110 |
| 5,359,232 | 10/1994 | Eitrheim et al. | 327/116 |
| 5,589,782 | 12/1996 | Sharpe-Geisler | 326/38 |
| 5,754,489 | 5/1998 | Kim | 365/221 |
| 5,844,844 | 12/1998 | Bauer et al. | 365/189.02 |

FOREIGN PATENT DOCUMENTS

| | | | |
|---|---|---|---|
| 0385567 | 9/1990 | European Pat. Off. . | |
| 63-232615 | 9/1988 | Japan | 327/99 |

OTHER PUBLICATIONS

Shih–Lien Lu , "A Safe Single–Phase Clocking Scheme For CMOS Circuits", IEEE Journal of Solid–State Circuits, vol. 23, No. 1, pp. 280–283, Feb. 1988.

Neil Weste and Kamran Eshraghian, "Principles of CMOS VLSI Design, A Systems Persepective", Second Edition, Addison Wesley Publishing Company, Copyright 1993, pp 328–329.

M. Afghahi and J. Yuan, "Double Edge–Triggered D–Flip–Flops for High Speed CMOS Circuits"; IEEE Journal of Solid State Circuits, vol. 26, No. 8, pp. 1168–1170, Aug. 1991.

Stephen H. Unger, "Double–Edge–Triggered Flip–Flops"; IEEE Transactions on Computers, vol. C–30, No. 6, pp. 447–451, Jun. 1981.

Shih–Lien Lu and Milos Ercegovac, "A Novel CMOS Implementation of Double–Edge–Triggered Flip–Flops", IEEE Journal of Solid–State Circuits, vol. 25, No. 4, pp. 1008–1010, Aug. 1990.

*Primary Examiner*—Kenneth B. Wells
*Attorney, Agent, or Firm*—Lois D. Cartier

[57] ABSTRACT

A clock distribution circuit and method for programmable ICs whereby the incoming clock frequency is optionally divided by two and distributed at the new, lower frequency. Programmable dual-edge/single-edge flip-flops are provided that optionally operate at twice the frequency of the distributed clock, being responsive to both rising and falling edges of the distributed clock. When the clock divider is enabled and the flip-flops are programmed as dual-edge, the operating frequency is the same as that of the incoming clock; however, the frequency of the distributed clock is reduced by one-half. This reduction halves the frequency at which the clock distribution circuits operate, and consequently approximately halves the power dissipated by the clock distribution circuit, thereby providing a programmable power-saving mode.

13 Claims, 2 Drawing Sheets

PROGRAMMABLE POWER REDUCTION IN A CLOCK-DISTRIBUTION CIRCUIT

CROSS-REFERENCE TO RELATED APPLICATIONS

This application relates to the following commonly assigned, concurrently filed U.S. patent application: Ser. No. 08/890,951, now issued as U.S. Pat. No. 5,844,844 invented by Trevor J. Bauer, Stephen M. Trimberger, and Steven P. Young and filed on Jul. 9, 1997 entitled "FPGA MEMORY ELEMENT PROGRAMMABLY TRIGGERED ON BOTH CLOCK EDGES", now issued U.S. Pat. No. 5,844,844, which is incorporated herein by reference.

BACKGROUND OF THE INVENTION

Field of the Invention

The invention relates to programmable integrated circuits (ICs). More particularly, the invention relates to a method and apparatus for programmably reducing power dissipation in programmable IC clock distribution networks.

Description of the Background Art

It is well known that the power dissipation of a CMOS circuit is proportional to the frequency of operation. As the clock frequency increases, the die becomes hotter, with the temperature increase at any level of power dissipation being determined by the thermal characteristics of the package. Thus, the maximum speed at which a design can operate may be limited not by the speed at which logic paths no longer have time to settle, but by the speed at which the package can no longer conduct heat away from the die fast enough to maintain a permissible temperature.

For example, without airflow the minimum package thermal resistance that can be achieved is around 10° C. per watt. (In other words, the die temperature increases 10° C. above the ambient temperature for each watt dissipated.) If the maximum ambient temperature is 50° C., and the maximum permitted die temperature is 125° C., the 75°C. temperature difference permits a maximum power dissipation of 7.5 watts.

It is to be expected that power dissipation levels equal to or greater than 7.5 watts will be commonplace in large high-performance ICs. Thus, performance will be limited by power dissipation, and reducing power dissipation is of value since it will permit an IC to be operated at a higher frequency.

In particular, clock-distribution power is a concern in the design of ICs, accounting for as much as 25% of the total power dissipation.

M. Afghahi and J. Yuan, in "Double Edge-Triggered D-Flip-Flops for High-Speed CMOS Circuits", IEEE Journal of Solid-State Circuits, pages 1168–1170, Vol. 26, No. 8, August 1991, which is incorporated herein by reference, suggest reducing the power dissipation of a clock distribution circuit by using flip-flops triggered on both edges of the clock pulses instead of on only one edge, while distributing a clock at half frequency to achieve the same data rate. Afghahi and Yuan propose two circuits for such a double-edge triggered flip-flop.

Additional circuits for double-edge flip-flops are disclosed by Stephen H. Unger in "Double-Edge-Triggered Flip-Flops," IEEE Transactions on Computers, Vol. C-30, No. 6, pages 447–451, June 1981; and by Shih-Lien Lu and Milos Ercegovac in "A Novel CMOS Implementation of Double-Edge-Triggered Flip-Flops", IEEE Journal of Solid-State Circuits, Vol. 25, No. 4, August 1990, pages 1008–1010; both of which are incorporated herein by reference.

SUMMARY OF THE INVENTION

The invention provides a clock distribution circuit and method for programmable ICs whereby the incoming clock frequency is optionally divided by two and distributed at the new, lower frequency. (The term "programmable ICs" as used herein includes but is not limited to FPGAs, mask programmable devices such as Application Specific ICs (ASICs), Programmable Logic Devices (PLDs), and devices in which only a portion of the logic is programmable.) Programmable dual-edge flip-flops are provided that optionally operate at twice the frequency of the distributed clock, being responsive to both rising and falling edges of the distributed clock.

When the clock divider is disabled and the flip-flops are programmed as single-edge, the operating frequency is the same as the frequency of the incoming clock. When the clock divider is enabled and the flip-flops are programmed as dual-edge, the operating frequency is also the same as the frequency of the incoming clock; however, the frequency of the distributed clock is reduced by one-half. This reduction halves the frequency at which the clock distribution circuits operate, and consequently approximately halves the power dissipated by the clock distribution circuits. Therefore, in a programmable IC wherein the clock distribution circuits dissipate 25% of the total power, the method of the invention reduces the total power dissipation of the IC by about 12.5%. As a result, the speed at which the device can operate with the same maximum die temperature increases by 12.5%. Therefore, this capability provides a programmable power-saving mode for the programmable IC.

In Field Programmable Gate Arrays (FPGAs) or other programmable ICs, users design their own circuits to be placed in the programmable ICs. Some of these user circuits may require the use of both edges of the incoming clock. One such circuit is described by New in U.S. Pat. No. 4,621,341, "Method and Apparatus for Transferring Data in Parallel From a Smaller to a Larger Register". Other examples include input/output (I/O) circuitry, which sometimes clocks in data on one edge of the clock and clocks out data on the other edge, to increase I/O bandwidth; and state machines generating signal pulses narrower than a full clock period, such as a RAM write enable pulse one-half clock period in length. In such cases, the clock cannot easily be divided down. In user circuits not requiring both edges of the incoming clock, the power-saving mode can be utilized. Another application for the invention is the capability of mixing single-edge and double-edge flip-flops in a single design for a programmable IC. Prior to the invention, such circuits were typically implemented using a clock enable signal that deactivated a single-edge flip-flop every other clock cycle. This application can now be implemented more simply by distributing only the half-frequency clock, and programming each flip-flop to function at the appropriate frequency. Therefore, the invention supplies a useful function that can be adapted to the needs of the programmable IC user.

BRIEF DESCRIPTION OF THE DRAWINGS

The present invention is illustrated by way of example, and not by way of limitation, in the following figures, in which like reference numerals refer to similar elements.

DETAILED DESCRIPTION OF THE DRAWINGS

A programmable clock distribution circuit according to the invention is described. In the following description, numerous specific details are set forth in order to provide a more thorough understanding of the present invention. However, it will be apparent to one skilled in the art that the present invention may be practiced without these specific details. In other instances, well-known features have not been described in detail in order to avoid obscuring the present invention.

Figure 1:
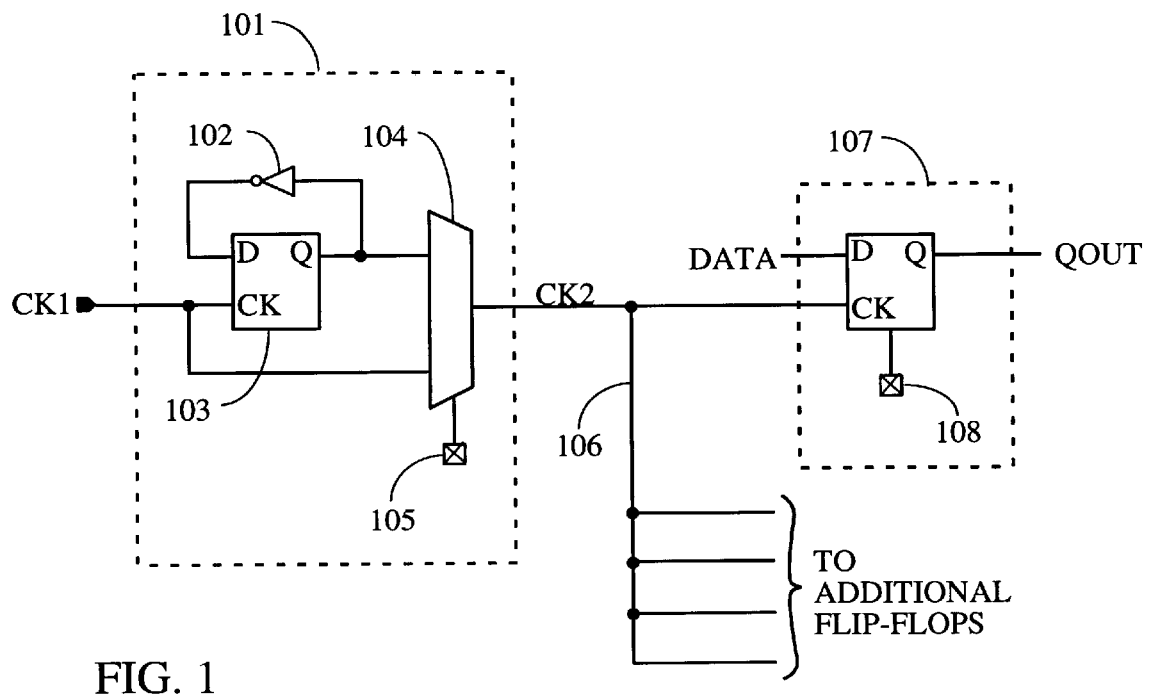
FIG. 1 shows a programmable clock distribution circuit for an FPGA according to one embodiment of the invention.

FIG. 1 shows a clock distribution circuit for an FPGA according to a first embodiment of the invention. The clock distribution circuit of FIG. 1 comprises a programmable clock divider 101, a clock distribution network 106, and a programmably double-edge flip-flop 107, which is one of a plurality of such flip-flops. Incoming clock CK1 enters programmable clock divider 101. In programmable clock divider 101, clock CK1 drives both one input of multiplexer 104 and the clock input of single-edge flip-flop 103. The output of flip-flop 103 feeds back through inverter 102 to the data input D of flip-flop 103, thereby forming a clock divider that divides the clock frequency by two. The output of flip-flop 103 also drives one input of multiplexer 104. Configurable memory cell 105 selects one or the other input of multiplexer 104, generating an output CK2 with either the same frequency as clock CK1 (when multiplexer 104 selects CK1) or one-half of that frequency (when multiplexer 104 selects the output of flip-flop 103). Clock CK2 is distributed on clock distribution network 106 to a plurality of programmable flip-flops, one of which is programmable flip-flop 107, controlled by configuration memory cell 108. The bit stored in configuration memory cell 108 selects either single-edge or double-edge functionality for programmable flip-flop 107. In other embodiments, more than one flip-flop can be controlled by memory cell 108, or memory cells 105, 108 can be replaced by a single memory cell.

Figure 2:
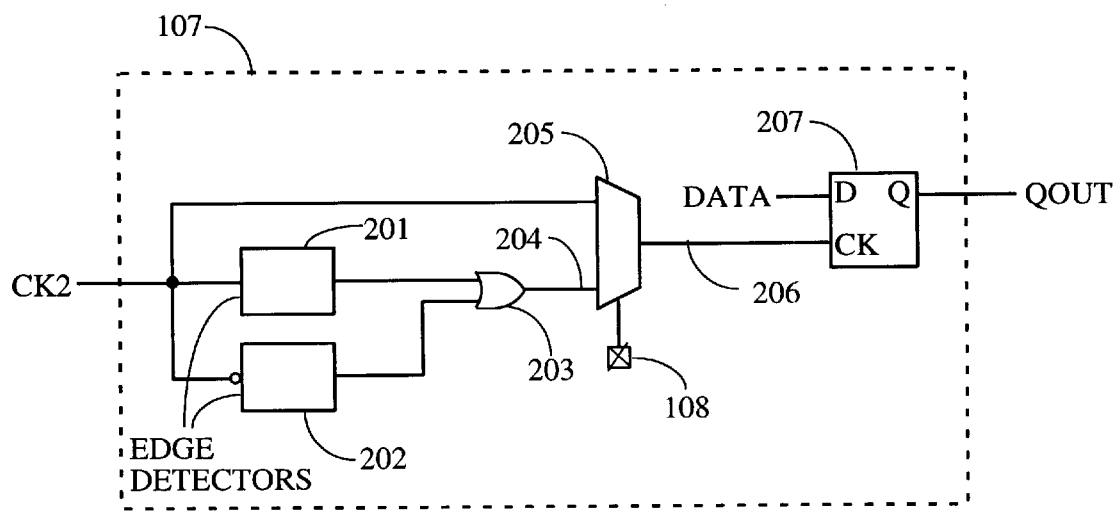
FIG. 2 shows a first implementation for the programmable double-edge flip-flop of FIG. 1.

Programmable flip-flop 107 can be implemented in many different ways. One such programmable flip-flop is shown in FIG. 2, comprising two edge-detectors 201, 202 programmably driving a single-edge flip-flop 207. Clock CK2 drives three destinations: programmable multiplexer 205, rising edge detector 201, and falling edge detector 202. Rising edge detector 201 generates a pulse whenever a rising edge on clock CK2 is detected. Falling edge detector 202 generates a pulse whenever a falling edge on clock CK2 is detected. (Edge detectors are notoriously well-known in the art and therefore are not described herein.) Rising and falling edge detectors 201, 202 both drive OR-gate 203; therefore either a rising edge or a falling edge on clock CK2 generates a high pulse on the output 204 of OR-gate 203. Multiplexer 205 has two inputs, output 204 of OR-gate 203, and clock CK2, one of which is selected by configuration memory cell 108. Therefore, configuration memory cell 108 uses multiplexer 205 to select between a single-edge path (from clock CK2) and a double-edge path (through OR-gate 203). The output 206 of multiplexer 205 is used to clock single-edge flip-flop 207 and create programmable flip-flop output QOUT.

Figure 3:
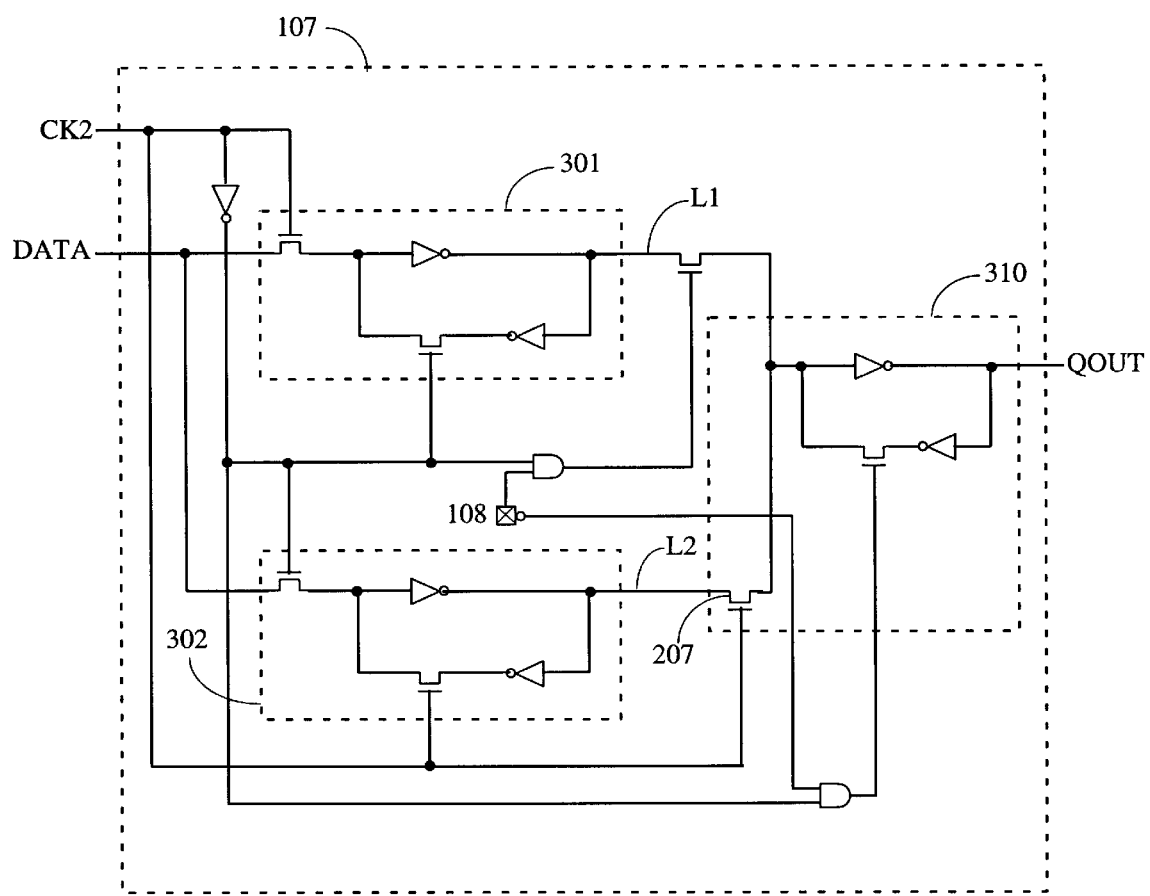
FIG. 3 shows a second implementation for the programmable double-edge flip-flop of FIG. 1.

Another programmable flip-flop that can be used to implement flip-flop 107 of FIG. 1 is shown and described by Trevor J. Bauer, Stephen M. Trimberger, and Steven P. Young in 08/890,951 U.S. Pat. No. 5,844,844 entitled "FPGA Memory Element Programmably Triggered on Both Clock Edges", now issued U.S. Pat. No. 5,844,844, which is referenced above and incorporated herein by reference. The programmable flip-flop of FIG. 3 comprises two latches, one transparent low latch 302 and one transparent high latch 301. One or the other of these latches, each time the clock changes state, latches in a new value. When configured as a dual-edge flip-flop, the output of the inactive latch is fed forward to drive the output QOUT of the dual-edge flip-flop. When configured as a single-edge flip-flop, the output of transparent low latch 302 is fed forward to a third latch 310 (which is transparent high), forming a rising edge flip-flop. The circuit of FIG. 3 is shown in Bauer et al's FIG. 4, and described in detail by Bauer et al.

The embodiments described herein will suggest to one of ordinary skill in the FPGA design art the steps of adapting dual-edge triggered flip-flops or memory elements (currently known or unknown) to be programmably dual-edge or single-edge, and substituting such adapted flip-flops into the present invention. Dual-edge flip-flops that could be used in such a manner include those of Afghahi and Yuan, Lu and Ercegovac, Unger, and Bauer et al.

It has been demonstrated that the programmable clock distribution circuit of the present invention offers significant reduction of power dissipation. Further, for programmable IC users little or no modification to their designs would be required if a programmable IC were adapted to use the optional power-saving mode, provided that the double-edge flip-flop used in a given implementation has the same inputs and outputs as the flip-flops in the programmable IC without said mode.

Those having skill in the relevant arts of the invention will now perceive various modifications and additions which may be made as a result of the disclosure herein of preferred embodiments. Accordingly, all such modifications and additions are deemed to be within the scope of the invention, which is to be limited only by the appended claims and their equivalents.

What is claimed is:

1. A method for reducing power dissipation in a clock distribution circuit for a programmable IC, comprising:

a) receiving a first clock;

b) generating from the first clock a second clock, programmably having either half the frequency of the first clock or the same frequency as the first clock; and c) distributing the second clock but not the first clock to a plurality of flip-flops in the circuit, the flip-flops operating at twice the frequency of the distributed clock in a first programmed state, and operating at the same frequency as the distributed clock in a second programmed state.

2. The method of claim 1, wherein the programmable IC is an FPGA.

3. The method of claim 1, wherein the flip-flops each comprise:

a rising edge detector;

a falling edge detector; and a single-edge flip-flop programmably driven by said rising and falling edge detectors.

4. The method of claim 1, wherein the flip-flops each comprise:

two latches responsive to different edges of the distributed clock; and means for selecting between the outputs of said two latches.

5. A programmable clock distribution circuit for a programmable IC, comprising:

a programmable clock divider for receiving an incoming clock and programmably generating from the incoming clock a second clock, the second clock programmably having either half the frequency of the incoming clock or the same frequency as the incoming clock;

a plurality of programmable flip-flops, said flip-flops being programmably either dual-edge or single-edge; and a clock distribution network for distributing the second clock but not the incoming clock from said programmable clock divider to said plurality of programmable flip-flops, such that the flip-flops operate at twice the frequency of the second clock in a first programmed state, and operate at the same frequency as the second clock in a second programmed state.

6. The programmable clock distribution circuit of claim 5, wherein the programmable IC is an FPGA.

7. The programmable clock distribution circuit of claim 5, wherein said programmable flip-flops each comprise:

a rising edge detector;

a falling edge detector; and a single-edge flip-flop programmably driven by said rising and falling edge detectors.

8. The programmable clock distribution circuit of claim 5, wherein said programmable flip-flops each comprise:

two latches responsive to different edges of the distributed clock; and means for selecting between the outputs of said two latches.

9. A clock distribution circuit for a programmable IC, comprising:

an input port for receiving an incoming clock;

programmable means for generating a second clock from the incoming clock, the second clock programmably having either half the frequency of the incoming clock or the same frequency as the incoming clock;

a plurality of programmable flip-flops, said flip-flops being programmably either dual-edge or single-edge; and a clock distribution network for distributing the second clock but not the incoming clock to said plurality of programmable flip-flops, such that said flip-flops operate at twice the frequency of the second clock in a first programmed state, and operate at the same frequency as the second clock in a second programmed state.

10. The clock distribution circuit of claim 9, wherein the programmable IC is an FPGA.

11. The clock distribution circuit of claim 9, wherein said programmable means for generating a second clock comprises a programmable clock divider.

12. The clock distribution circuit of claim 9, wherein said programmable flip-flops each comprise:

a rising edge detector;

a falling edge detector; and a single-edge flip-flop programmably driven by said rising and falling edge detectors.

13. The clock distribution circuit of claim 9, wherein the programmable flip-flops each comprise:

two latches responsive to different edges of the distributed clock; and means for selecting between the outputs of said two latches.

\* \* \* \* \*